R. L. JAMESON.
ICE CREAM FREEZER.
APPLICATION FILED MAY 15, 1911.

1,013,779.

Patented Jan. 2, 1912.

Witnesses
L. B. James
O. B. Hopkins

Inventor
R. L. Jameson
by H. B. Willson & Co.
Attorneys

COLUMBIA PLANOGRAPH CO., WASHINGTON, D. C.

UNITED STATES PATENT OFFICE.

ROLAND LEE JAMESON, OF HILLSBORO, TEXAS, ASSIGNOR TO H. W. VAUGHAN AND J. H. BENNETT, OF HILLSBORO, TEXAS.

ICE-CREAM FREEZER.

1,013,779. Specification of Letters Patent. Patented Jan. 2, 1912.

Application filed May 15, 1911. Serial No. 627,312.

*To all whom it may concern:*

Be it known that I, ROLAND LEE JAMESON, a citizen of the United States, residing at Hillsboro, in the county of Hill and State of Texas, have invented certain new and useful Improvements in Ice-Cream Freezers; and I do declare the following to be a full, clear, and exact description of the invention, such as will enable others skilled in the art to which it appertains to make and use the same.

This invention relates to improvements in ice cream freezers.

One object of the invention is to provide an ice cream freezer having arranged therein a number of independently and removably supported receptacles in which the cream is frozen in the form of sticks of suitable size and shape.

Another object is to provide a freezer of this character which will be simple, strong and durable in construction, efficient and reliable in operation and in which several flavors or kinds of cream may be frozen at the same time.

With these and other objects in view, the invention consists of certain novel features of construction, combination and arrangement of parts as will be more fully described and particularly pointed out in the appended claim.

Figure 1:
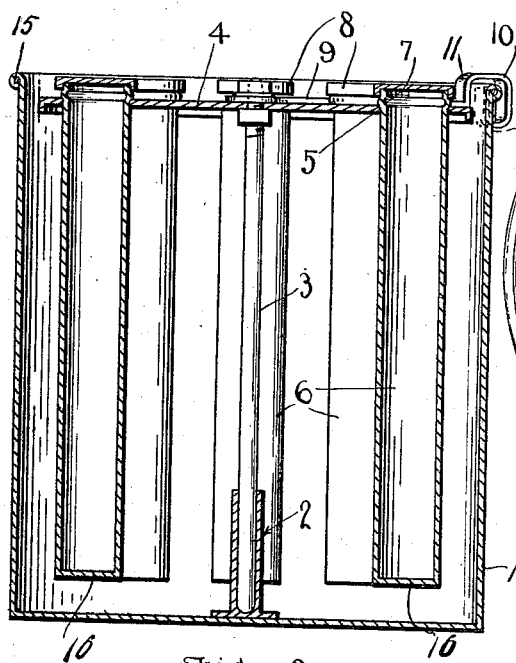
Figure 2:
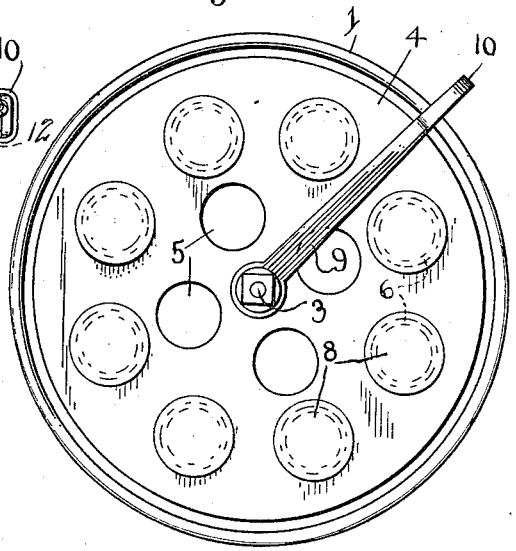
Figure 3:
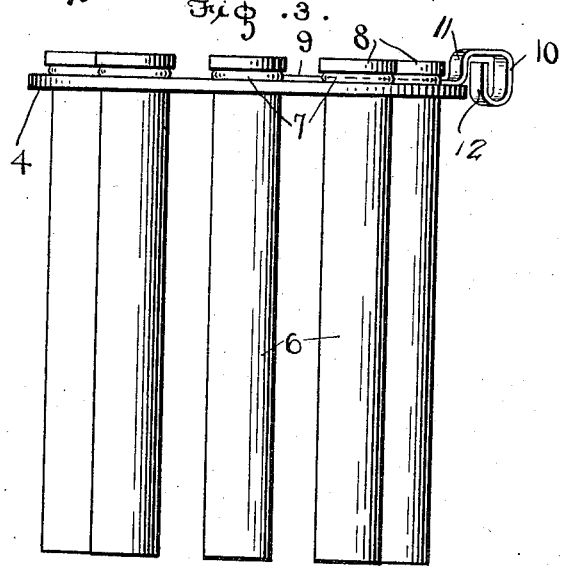
Figure 4:
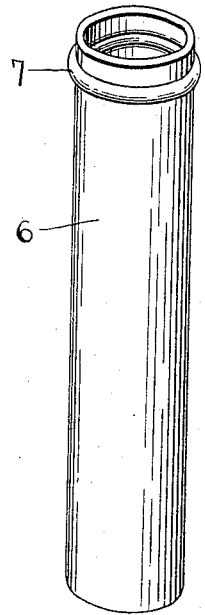

In the accompanying drawings: Figure 1 is a vertical longitudinal sectional view of an ice cream freezer constructed in accordance with my invention. Fig. 2 is a top plan view. Fig. 3 is a side view of the tube holder and tubes removed. Fig. 4 is a detail perspective view of one of the tubes.

My improved ice cream freezer comprises a tub, can or other suitable receptacle 1 which may be of any desired size and preferably has its open upper end surrounded by a bead 15; and in the center of the bottom of this can is arranged an upwardly extending tubular bearing socket 2. Revolubly engaged with the socket 2 is a vertically disposed shaft 3 the length of which is approximately the same as the height of the can. Secured to the upper end of the shaft is a tube supporting plate 4 having formed therein, a plurality of tube receiving openings 5 with which are engaged a plurality of cream receiving tubes 6 closed at their lower ends as at 16. The plate 4 may be provided with any desired number of openings 5 to receive a corresponding number of tubes. The openings and tubes may also be of any desired size and shape, said openings being here shown as of circular form while the tubes are cylindrical to fit the openings. The tubes 6 have formed thereon near their upper ends annular ribs or beads 7 which engage the edges of the openings 5 in the plate 4 whereby the tubes are supported by the plate and their closed lower ends hang within the can or receptacle 1, as shown. The upper ends of the tubes are removably closed by removable caps 8 which are engaged therewith or secured thereto in any suitable manner. Secured to the upper end of the shaft 3 is an operating arm 9 which projects radially from the shaft over the plate 4 and the bead at the upper edge of the can 1 and has its outer end bent upward to form a shoulder 11, thence outward to form a handle 10 whereby the shaft together with the plate and tubes may be oscillated or revolved, and thence upward as at 12 beneath the bead 15 to form a stop movable under said bead as the handle is manipulated or revolved.

In the operation of the freezer, a suitable freezing solution is placed in the can or receptacle, and the cream or other preparation to be frozen is placed in the tubes. The latter are then closed and dropped into the openings 5 until the beads 7 rest around the same upon the plate 4; and then the shaft 6 is inserted in the socket 2 and the plate and tubes assume the position shown in Fig. 1 within the can in the manner described. In so inserting the device in the can, the shoulder 11 on the arm 9 passes inside the mouth of the can, the handle 10 passes over its bead 15, and the stop 12 stands outside of the mouth of the can below said bead as best seen in Fig. 1; and its results from this construction in connection with the fact that the bearing socket 2 is made rather long or deep as shown, that no upper bearing for the shaft 3 is necessary. This greatly cheapens the cost of manufacture, prevents the necessity for removing a spider or other bearing from the upper end of the shaft before the latter can be withdrawn as for cleaning, avoids the necessity for moving each opening 5 out from under said spider in order to withdraw its tube 6, and allows a certain lateral play of the whole revolving mechanism which I find extremely useful where the can 1 is packed with ice. After being frozen the tubes are removed from their openings in the plate 4, one at a time, or as needed and placed in water for a short time to slightly warm the tubes after which the caps are removed from the tubes and the frozen contents allowed to slide therefrom in the form of sticks having the shape of the tubes. By providing a plurality of tubes as herein shown and described, several flavors or kinds of cream or other preparation may be simultaneously frozen in the same can.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim is:

In an ice cream freezer, the combination with a cylindrical can having a bead around its mouth, and a deep bearing socket rising from the center of its bottom; of an upright shaft removably journaled in said bearing, a plate carried by the upper end of the shaft and having a number of openings, cream-receiving tubes removably engaging said openings and having surrounding beads above the plate and closed lower ends, closures for the upper ends of the tubes, and an arm secured at its inner end to the upper extremity of said shaft and projecting radially therefrom, having a shoulder adjacent the inner face of the mouth of the can, then passing over the upper edge of the latter in a handle, and thence carried downward and upward into a stop standing outside of the can and beneath said bead, all as and for the purpose set forth.

In testimony whereof I have hereunto set my hand in presence of two subscribing witnesses.

ROLAND LEE JAMESON.

Witnesses:
W. B. RICHARDSON,
R. C. WEST.

---

Copies of this patent may be obtained for five cents each, by addressing the "Commissioner of Patents, Washington, D. C."